UNITED STATES PATENT OFFICE.

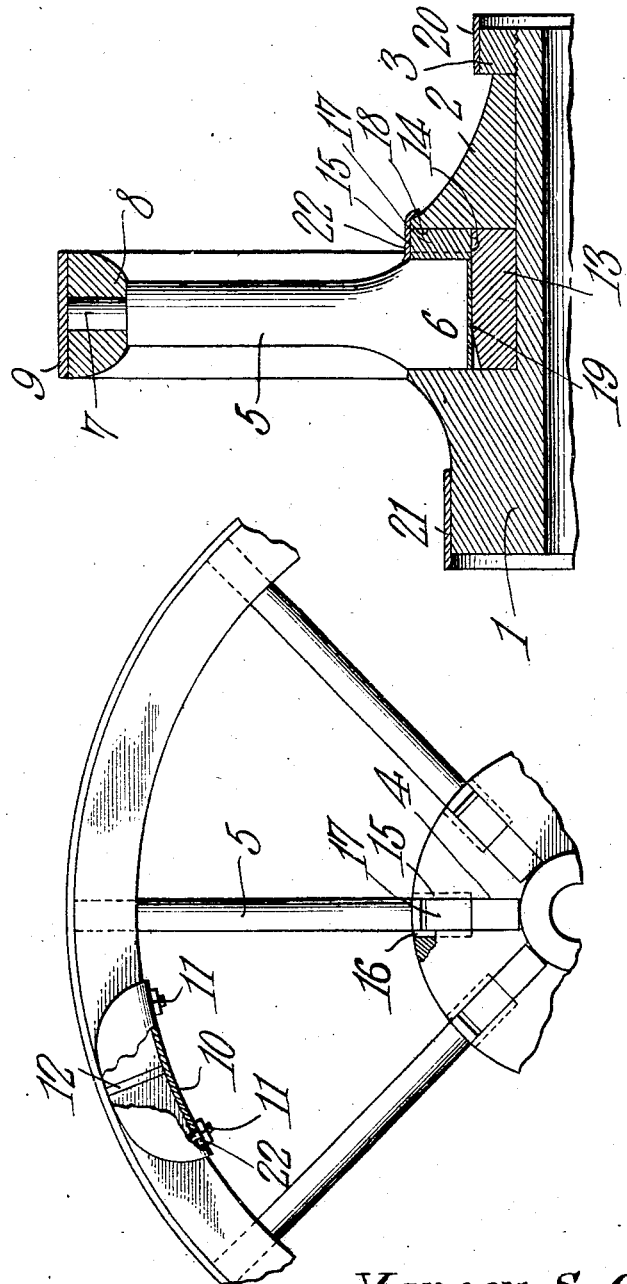

YANCEY SCARBOROUGH COOK, OF GREENVILLE, ALABAMA.

VEHICLE-WHEEL.

No. 859,370.　　　　Specification of Letters Patent.　　　　Patented July 9, 1907.

Application filed March 29, 1907. Serial No. 365,389.

*To all whom it may concern:*

Be it known that I, YANCEY SCARBOROUGH COOK, a citizen of the United States, residing at Greenville, in the county of Butler and State of Alabama, have invented a new and useful Vehicle-Wheel, of which the following is a specification.

This invention has reference to improvements in vehicle wheels, and its object is to produce a wheel in which any one of the spokes may be removed without dismantling the wheel or even without removing the wheel from the axle, and provision is made for tightening the tire should the same become loose on the felly.

The invention consists essentially in a two-part hub having formed in it radial seats for the spokes, which seats are deep enough to receive the spokes with the tenon ends interior to the sockets in the felly, and from which seats the spokes are movable radially outward to seat their tenon ends in the felly, and the spokes are there held by wedges introduced between their butt ends and the bottoms of the seats formed in the hub, after which the spokes are locked against longitudinal displacement on the hub by other wedges or blocks having seats formed on the hub, and these blocks are secured in their seats against accidental displacement by placing against them a removable portion of the hub, which removable portion is finally locked by a suitable nut applied to the end of the hub.

The invention will be fully understood from the following detailed description taken in connection with the accompanying drawing forming part of this specification, in which—

Figure 1 is a side view, partly in section and with parts removed, of a segment of a wheel embodying my invention; and Fig. 2 is a section of the same taken centrally and longitudinally through the hub.

Referring to the drawings, there is shown a hub 1 which may be of the usual shape used in wagon wheels.
This hub has one end 2 removable as a whole and this removable portion is secured in place by a nut 3 screwed on the corresponding end of the hub. The body portion of the hub is provided with a number of radial seats 4 for spokes 5, the butts 6 of which are shaped to adapt the spokes to the seats in the hub and the other or outer ends of which are formed with round tenons 7 to be inserted in round mortises in the felly 8 in the usual manner, and this felly is surrounded by the usual tire 9. The felly is, as usual, made in sections, and cuffs 10 are provided at the meeting edges of the felly sections to which sections they are fastened by the usual bolts 11, and in order to take up shrinkage or tighten the felly to make it properly fit the tire 9, wedges 12 may be driven in between the meeting ends of the felly sections. For this purpose the cuffs are removed and after the wedges are inserted the cuffs are replaced.

Referring now again to the seats or sockets 4, it will be observed that they are considerably deeper than is necessary to receive the butts 6 of the spokes, and these sockets are open along one face, against which face the section 2 of the hub fits. The seats 4 are deep enough so that when the butt of a spoke rests on the bottom of a seat 4, the tenon 7 may be moved laterally into coincidence with a mortise in the felly 8. Then by moving the spoke radially the tenon 7 may be seated in the mortise or socket in the felly 8, thus lifting the butt 6 away from the bottom of the seat 4. The space thus left between the bottom of the butt 6 of the spoke and the bottom of the seat 4 is filled by a wedge block 13 of such size that when introduced into the seat its outer end will be flush with the face of the hub covered by the section 2, and in order that this wedge or block 13 may be readily removed it is provided with a notch 14 which may be engaged by a suitable tool to pull the block 13 out from under the butt 6 of the spoke 5 when the hub section 2 is removed.

Each seat 4 is provided along its side walls at points close to the corresponding edge of the butt 6 of the spoke with grooves 15 in which engage tongues 16 formed on other blocks 17 adapted to move radially into the seats 4 in the space therein between the butts 6 of the spokes and the outer face of the hub through which the seats 4 open and which is normally covered by the removable section 2. The blocks 17 are also provided with notches 18 by means of which they may be readily removed. Now, it will sometimes occur that the spokes will shrink and so become loosened in their seats.
In such case the block 17 may be removed and then the plates or wedges 19 may be driven in between the wedges 13 and the bottoms of the butts 6 of the spokes and also, when necessary, between the blocks 17 and the corresponding parts of the spokes.

The hub 1 and removable section 2 may be made of cast iron, while the nut 3 may be made of malleable iron. The nut 3 has a band 20 shrunk thereon and the hub at the end remote from the nut 3 has a band 21 shrunk thereon, while the removable section 2 carries a band 22 shrunk thereon and so located as to cover the outer ends of all the blocks 17 and thus hold them in place. All these bands may be made of malleable iron. Also, the hub will be provided with a suitable box like other hubs.

Now, suppose it is desirable to replace or adjust a spoke. The wheel need not be removed from the vehicle. It is only necessary to remove the nut 3, when the removable section 2 may be slipped off from the main portion of the hub 1. This will expose to view all the blocks 17 and also the wedges 13. Now, in order to remove the particular block 17 opposite the spoke it is desirable to remove or tighten, it is only necessary to lift out the block 17 in a direction parallel to the length of the spoke. Now, if it be desired simply to tighten the spoke, a thin wedge 19 is driven between the butt of the same and the block 13, after which the block 17 is replaced and the removable section 2 is slipped onto the hub and the nut 3 is screwed thereon. But if the spoke is damaged and it is desired to replace the same with a new spoke, the wedge or block 13 is removed when the spoke may be moved radially inward into the seat 4 for a distance sufficient to release the tenon from the corresponding socket in the felly 8, after which a new spoke may be put in its place and the wedges 13 and blocks 17 re-inserted and the removable section 2 and nut 3 replaced. Thus the wheel may be adjusted or repaired without even the necessity of removing it from the axle, while all the parts are securely locked in place by the simple nut 3.

It has already been stated that the felly may be forced outward against the tire in order to tighten the same. For this purpose, one or both of the bolt holes in the cuffs 10 are elongated or slotted, as indicated at 22, and when the felly is thus expanded against the tire to tighten the latter it may be then necessary to introduce not only the wedges 12 between the meeting ends of the felly but thin wedges 19 under the butts of the spokes, and between the blocks 17 and the corresponding sides of the spokes.

It will be understood that in order to make the inner or butt ends of the spokes engage firmly in the hub, the seats 4 may taper slightly in a lateral direction toward their closed ends and the butts of the spokes may also taper slightly to conform to the tapering of the seats 4. With such construction the spokes are more readily put into the felly and are more easily tightened in the hub.

I claim:—

1. A vehicle wheel comprising a two-part hub, with one part carried by the other and with radial seats formed in the main portion of the hub, spokes having butts adapted to said seats but of less length than the depth of said seats, wedges insertible longitudinally into said seats beneath the butts of the spokes, blocks having tongues adapted to grooves in said seats arranged parallel to the length of the spokes, and a retaining band or housing carried by the removable portion of the hub and overhanging the tongued blocks.

2. A vehicle wheel comprising a hub member having longitudinal seats formed therein, another hub member removably received on said first-named hub member, a removable nut on the first-named hub member for confining the second hub member thereto, spokes having butt ends adapted to the seats in the first-named hub member but of less length than the depth of said seats, wedge blocks between the spoke butts and the bottoms of the seats, other blocks insertible in said seats in a direction parallel to the length of the spokes, and a flange or housing carried by the removable member of the hub and overhanging those blocks which are movable in a plane parallel to the length of the spokes.

3. A vehicle wheel comprising a main hub member, a supplemental member removable therefrom, a nut for confining the supplemental member to the main hub member, radially adjustable spokes having seats in the main hub member, removable wedges insertible in the seats between the spokes and the bottoms of the seats, blocks insertible in the seats alongside of the spoke butts and in engagement with the other wedges in the seats, means provided in each block for the engagement of a removing tool therewith, a band or housing carried by the removable section of the hub and overhanging the blocks alongside of the spokes, means for expanding the felly to tighten the same on the tire, and cuffs embracing the contiguous ends of the felly sections and having slots whereby a relative movement of the cuffs with relation to the felly segments is permitted.

In testimony that I claim the foregoing as my own, I have hereto affixed my signature in the presence of two witnesses.

YANCEY SCARBOROUGH COOK.

Witnesses:
A. M. MELCALF,
R. E. PEAGLER.